HIGH SPEED LOW LEVEL SWITCHING DEVICE

Filed July 22, 1958 2 Sheets-Sheet 1

*INVENTORS.*
MARTIN L. KLEIN
HARRY C. MORGAN
BY ALAN GOUDEY
John A. Duffy
AGENT

INVENTORS.
MARTIN L. KLEIN
HARRY C. MORGAN
BY ALAN GOUDEY
John A. Duffy
AGENT

United States Patent Office 3,017,582
Patented Jan. 16, 1962

3,017,582

HIGH SPEED LOW LEVEL SWITCHING DEVICE

Martin L. Klein, Woodland Hills, Harry C. Morgan, Sherman Oaks, and Alan Goudey, Saugus, Calif., assignors to North American Aviation, Inc.

Filed July 22, 1958, Ser. No. 750,211
13 Claims. (Cl. 332—14)

This invention relates to switching circuits and more particularly to a high speed low level chopper stabilized multiplexer direct-current amplifier.

Modern high speed data conversion and handling systems require electronic switching circuits capable of processing data signals very rapidly and in an efficient manner. Present-day computers for handling data require systems which furnish input data to a computer at a high rate of speed. In particular, systems handling low level analog data require a switching circuit for processing the data and presenting it in a usable digital form to a digital computer. Switching devices for receiving direct-current analog data from a plurality of input channels and supplying usable digital data to a computer are well-known but of limited capabilities. Mechanical switches such as a reed type vibrator are limited to millisecond intervals with the attendant difficulties of synchronizing, jamming, and noise.

Electronic switching means such as series vacuum tubes have been satisfactory for high level switching only when drift requirements are not stringent. Drift in vacuum tubes due to changes inherent in tube characteristics clearly restricts their use in high level switching. Diode switching requires cooperating amplifier and other processing means which create inherent errors in the circuit.

The device of this invention overcomes the above-stated limitations and disadvantages of prior high speed switching circuits by providing a high speed low drift all-electronic switch for receiving direct-current signals and converting the signals to alternating-current signals suitable for presentation to a digital computer. Utilizing a novel combination of a diode chopping circuit, an alternating-current amplifier, and a gate circuit synchronized with the chopping circuit, a circuit is provided which is essentially free from inherent errors and limitations in present-day switching circuits.

According to the device of this invention, apparatus is provided which receives direct-current analog signals from a data system, converts the signals to substantially square wave alternating-current signals with a multivibrator-type chopping circuit in combination with diode switching means. Responsive to the output of the chopper circuit is a high gain alternating-current amplifier which presents square wave alternating-current signals to the input of a gating circuit. The gating circuit is synchronized with the chopping circuit to provide alternating-current square wave signals indicative of the information contained in the direct-current analog signals. The chopper circuit and gating circuit may be synchronized in response to a timing signal from a data handling system.

It is therefore an object of this invention to provide an improved electronic switching circuit.

It is another object of this invention to provide a high speed low level electronic switching circuit.

It is still another object of this invention to provide a high speed low level chopper stabilized direct-current amplifier.

It is a further object of this invention to provide a high speed low level multiplexer circuit for converting direct-current analog signals to alternating-current signals.

It is a still further object of this invention to provide an improved direct-current amplifier.

It is another object of this invention to provide a direct-current amplifier with improved drift characteristics.

It is still another object of this invention to provide an improved multiplexer circuit.

These and other objects of the invention will become apparent from the following description taken in connection with the accompanying drawings, in which FIG. 1 is a schematic diagram of the switching circuit for one channel of data;

Figure 1:
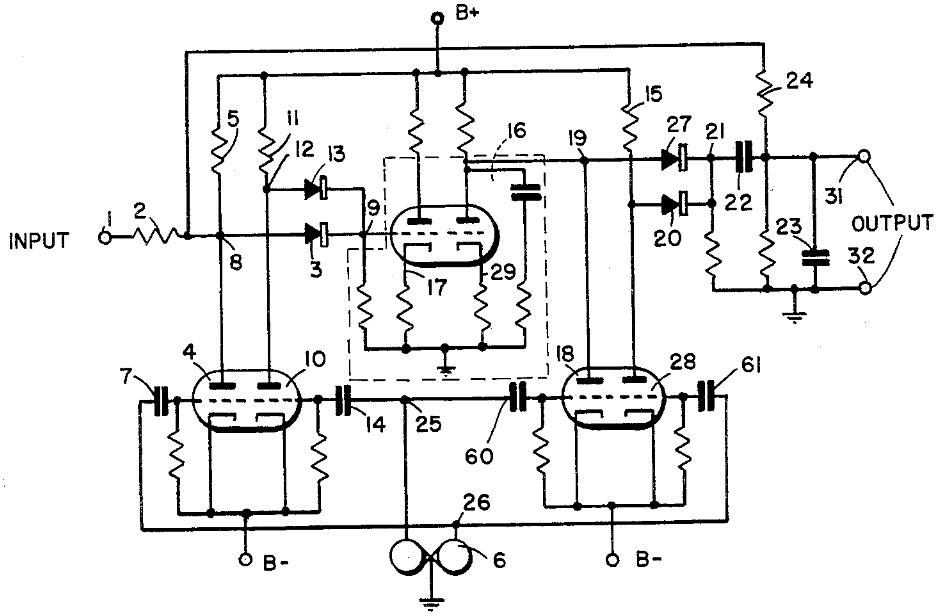

Referring to FIG. 1, input terminal 1 which is connected to receive a direct-current analog signal indicative of information to be handled by a data system is connected through input resistor 2 to the anodes of diode 3 and triode 4. Triode 4 receives operating potentials from B+ which is connected through anode resistor 5 to its anode and B— which is connected to its cathode. Triode 4 is responsive to a signal from one of the outputs of bistable multivibrator 6 coupled through capacitor 7 to its grid and operates to provide a substantially more negative potential than ground at point 8 which is common to the anodes of diode 3 and triode 4 when conducting, and acts as an open switch to point 8 when cut off. Diode 3 is biased to a conduction level substantially equal to the diode's conduction crossover point when triode 4 is non-conducting. Or, in other words, the bias potential on diode 3 is just sufficient to cause current flow through the diode. Multivibrator 6 provides the timing for the circuit and may comprise, for example, a pair of vacuum tubes connected in a conventional bistable manner. Multivibrator 6 is connected to be responsive to timing signals from circuits not a part of this invention. Associated with triode 4 and connected to be responsive to the other output of multivibrator 6 is triode 10 which receives operating potentials from B+ through resistor 11 at its anode and B— at its cathode. The anode of triode 10 is connected in common with the anode of diode 13. Diode 13 has its cathode connected in common with the cathode of diode 3. Triode 10 is responsive to multivibrator 6 through capacitor 14 connected to its grid and conducts in opposite relation to triode 4 to provide an alternatively opening and closing switch between point 12 and B—. Thus, when triode 4 is cut off, triode 10 is conducting, and when point 8 is coupled to B— through conducting triode 4, triode 10 presents an open switch between point 12 and B—. When triode 10 is conducting and triode 4 is cut off, point 12 is connected to B— through triode 10 and triode 4 presents an open switch between point 8 and B—. The switching of triodes 4 and 10 by multivibrator 6 operates to convert the direct-current analog signal at terminal 1 to an alternating-current chopped signal at point 9 common to the cathodes of diodes 3 and 13 which is presented to the input of amplifier 16. Amplifier 16 is an alternating-current amplifier which may be of conventional high gain cascode type and operates to amplify the alternating-current signal presented to its input. Amplifier 16 may comprise, for example triode 17 and triode 29 conventionally connected with the amplified output presented at the anode of triode 18. The output of amplifier 16 is applied to the anodes of diode 27 and triode 18 connected in common to point 19. Triode 18, in combination with triode 28 and diodes 27 and 20, operates as a gating circuit synchronized with the chopping circuit provided by triodes 4 and 10 by multivibrator 6 through input coupling capacitor 65 and 61. The circuit as shown is connected substantially the same as the chopper circuit comprising triodes 4 and 10 and diodes 3 and 13 with triode 18 connected to conduct when receiving an input signal from the same output terminal of multivibrator 6 which is connected to the input of triode 10. Triode 28 is thus synchronized with triode 4 receiving an input conduction signal from the same output of multivibrator 6 which controls triode 4. Thus, triodes 10 and 18 conduct and non-conduct at the same time and triodes 4 and 28 are likewise synchronized. The switching operation of triodes 18 and 28 operates to invert the square wave signal presented to point 19 by amplifier 16 which will be explained in more detail in relation to FIG. 2. The square wave signal at point 19 is connected through the plate-cathode circuit of diode 27 to point 21 which is also connected to the cathode of diode 20. Resistor 15 is connected between B+ and the anode of diode 20. Point 21 presents an inverted alternating-current square wave signal which is coupled through capacitors 22 and 23 to output terminals 31 and 32. Feedback resistor 24 is connected between output terminal 31 and point 8 of the input circuit as a negative feedback circuit.

Figure 2:
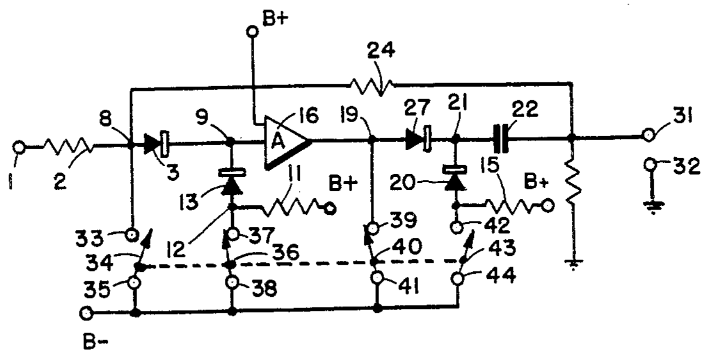
FIG. 2 is a block diagram illustrating functionally the operation of the circuit of FIG. 1.

The operation of FIG. 1 may be better explained by referring to the diagram shown in FIG. 2 which is a functional block diagram of the circuit of FIG. 1. In FIG. 2 input terminal 1 connects the received direct-current analog signal through resistor 2 to point 8 of the anode circuit of diode 3 and to terminal 33 of switch 34. Switch 34 is functionally equivalent to triode 4 of FIG. 1 with terminal 33 representing the anode and terminal 35 representing the cathode which is connected to B—. Triode 10 is represented functionally by switch 36, having terminal 37 corresponding to the anode of diode 13 connected through diode 13 to point 9 and terminal 38 corresponding to the cathode of diode 13 connected to B—. Amplifier 16 receives the alternating-current chopped wave at its input and presents an output to point 19 which is connected through terminals 39 and 41 of switch 40 to B—. Switch 40 corresponds to triode 18 of FIG. 1. Diode 27 has its anode connected to point 19 and its cathode connected to point 21. Point 21 is also connected through the cathode-anode circuit of diode 20 to terminal 42 of switch 43. Switch 43 corresponds to triode 28 with its terminal 44 equivalent to the cathode of triode 19 connected to B+. Output terminals 31 and 32 receive the output pulse from capacitor 22. Feedback resistor 24 is connected between output terminal 31 and point 8 of the input circuit.

As previously described in relation to the circuit of FIG. 1, switches 34 and 43 of FIG. 2, equivalent to triodes 4 and 28 respectively, are electronically ganged by multivibrator 6 of FIG. 1 to be always in the same position. Likewise switches 36 and 40 equivalent to triodes 10 and 18 respectively are ganged to be either closed or open. Thus, when switches 34 and 43 are open as shown in FIG. 2, switches 36 and 40 are closed. In this manner the input direct-current signal at terminal 1 is properly processed, maintaining stability and synchronization throughout its operation in the switching circuit which will be more explained below.

In operation of the diagram of FIG. 2, assume first that multivibrator 6 of FIG. 1 is in the state wherein switches 34 and 43 of FIG. 2 are open and switches 36 and 40 are closed. A direct-current analog signal at terminal 1 passes through diode 3 by reason of the open circuit presented by a switch 34 to point 8. Point 9 in the conduction circuit does not affect the transmitted signal because of the shorting of B+ through closed switch 36 to B—. Amplifier 16 amplifies the signal and presents it to point 19 where the signal is inverted by reason of the fact that B— is connected through closed switch 40 to point 19. The signal passes through diode 27 and arrives at point 21 where it is clamped to a predetermined level through diode 20. The signal is then coupled through capacitor 22 to output terminals 31 and 32. During the next half cycle of operation of multivibrator 6 switches 34 and 43 are closed and switches 40 and 36 are open. When switch 34 is closed, point 8 is clamped to B— preventing conduction through diode 3. Point 9 is clamped to a predetermined level through diode 13. Point 21 is clamped to B—. Thus, for a complete cycle of operation, a direct-current analog signal at terminal 1 is converted to a square wave at point 9, amplified by amplifier 16, and inverted at point 19 being presented as an output square wave alternating-current signal across output terminals 31 and 32.

Feedback resistor 24 operates as a negative feedback circuit by reason of the inversion of the square wave signal at point 19, thereby presenting a feedback signal to point 8 of the input circuit which is negative, or out of phase, with the input signal by a predetermined amount depending on the gain characteristics desired. Stabilization is thus maintained between the input and output circuits. Synchronization is maintained by the electronic ganging of switches 34 and 43 and switches 36 and 40. Thus, an input signal at point 8 is synchronized with the output signal at point 21 by multivibrator 6 of FIG. 1 which controls the action of switches 34 and 43 and 36 and 41.

Figure 3:
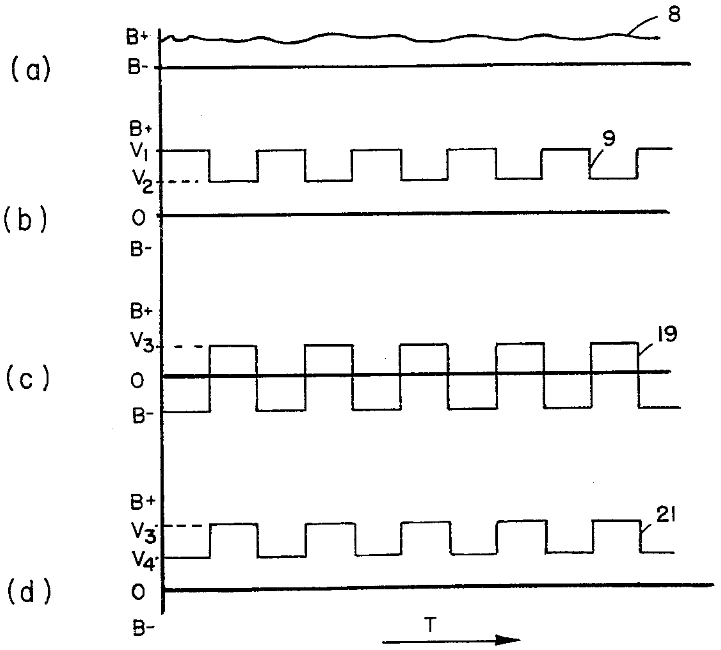
FIG. 3 is a graph illustrating the outputs at various points in the circuit of FIG. 1 and the diagram of FIG. 2.

Turning now to FIG. 3 there is shown in FIGS. 3(*a*), 3(*b*), and 3(*c*), and 3(*d*) a graph illustrating the outputs at points 8, 9, 19, and 21 of the circuit of FIG. 1 and the diagram of FIG. 2. FIG. 3(*a*) shows the direct-current analog signal applied to point 8. FIG. 3(*b*) shows the alternating-current square wave signal produced by the chopping circuit at point 9. The maximum amplitude of the signal is at $V_1$ which is established by the incoming signal from terminal 1 of FIG. 1. The minimum level is at $V_2$ established by the connection in FIG. 1 of B+ through resistor 11 at diode 13 to point 9. FIG. 3(*c*) shows the amplified alternating-current signal at point 19 with the maximum level $V_3$ being established by the anode of triode 29 in FIG. 1 and the minimum level B— being established by the connection from B— through the cathode-anode of triode 18 to point 19. It is noted that the waveform in FIG. 3(*c*) is an inverted wave or 180 degrees out of phase with the waveform of point 9. This exists because of the out of phase relationship between triode 18 and triode 4. FIG. 3(*d*) shows the signal at point 21. The waveform illustrated by FIG. 3(*d*) is synchronized with the waveform of FIG. 3(*b*) by reason of the ganging of triodes 4 and 28 and 10 and 18 by multivibrator 6 of FIG. 1. The maximum amplitude of the point 21 signal is at $V_3$ which is established by the anode of triode 12. The minimum level is at $V_4$ established by the connection in FIG. 1 of B+ through resistor 15 and diode 20 to point 21.

Figure 4:
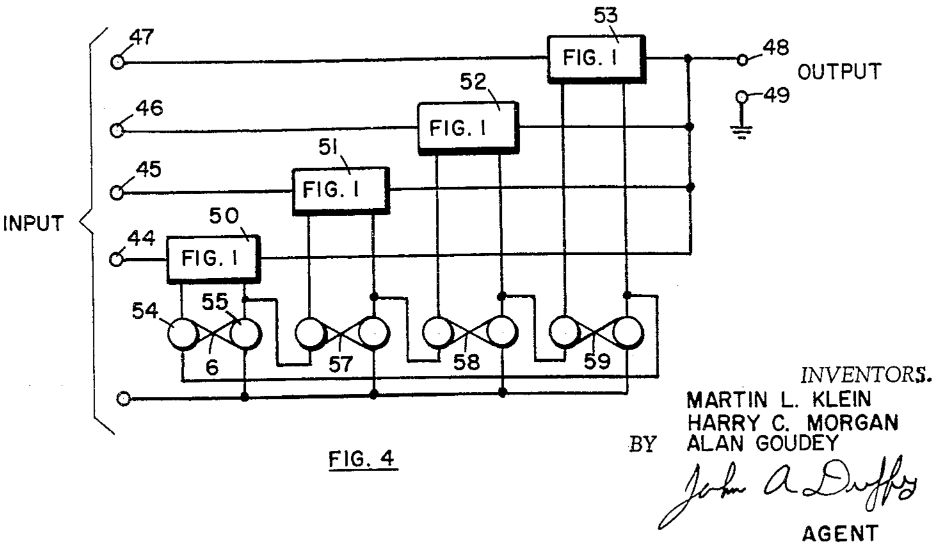
FIG. 4 is a schematic diagram partly in block form illustrating the multiplexing operation with a plurality of input channels.

The circuit of FIG. 1 and the functional diagram of FIG. 2 show the operation of the electronic switch of this invention for a single analog input channel. In data processing systems having a plurality of input channels, a multiplexing system is illustrated in FIG. 4 which utilizes one electronic switch of FIG. 1 for each input channel. FIG. 4 shows a plurality of input channels 44, 45, 46, and 47, each connected through an electronic switch identical with the switch of FIG. 1 to present alternating-current outputs across output terminals 48 and 49. Blocks 50, 51, 52, and 53 each represent a complete electronic switch as shown in FIG. 1. Block 50, for example, receives an analog input from terminal 47 which corresponds to input terminal 1 of FIG. 1. In addition, block 50 is responsive to signals from output terminals 25 and 26 of multivibrator 6. Block 51 likewise is responsive to the output terminals of multivibrator 57, blocks 52 and 53 are responsive to multivibrators 58 and 59. Multivibrators 6, 57, 58, and 59 are connected to form a timing circuit and may comprise, for example, a ring counter of the type described in "High Speed Computing Devices," 1950, by Engineering Research Associates, pp. 23–25 and illustrated in FIGS. 3–7 thereof. Such ring counters are well-known in the art and will not be described in further detail here. It is sufficient to note that multivibrators 6, 57, 58, and 59 operate as switching devices for blocks 50, 51, 52, and 53, and successively switch blocks 50, 51, 52, and 53 in sequence so that alternating-current signals are received at output terminals 48 and 49 successively indicative of the analog signals presented to terminals 44, 45, 46, and 47. Thus, for example, when input terminal 44 presents a direct-current analog signal to block 50, output terminals 48 and 49 receive a corresponding amplified alternating-current square wave signal from the switch in block 50. The next cycle of operation determined by the ring counter provides an alternating-current signal to terminals 48 and 49 indicative of the input signal at terminal 45. Successively terminals 46 and 47 are monitored presenting output signals to terminals 48 and 49. Four input channels are shown in FIG. 3, for example only, and any number of input channels depending on the requirements of a particular data handling system may be used. Also the ring counter shown in FIG. 3 may be replaced by any timing device necessary for compatible operation with the particular data handling system utilized.

The high speed stable circuit of FIG. 1 is particularly adaptable to multiplexing systems such as shown in FIG. 4 because of the exact synchronism obtained in the circuit of FIG. 1 by synchronizing the chopping circuit of diodes 4 and 10 with the gate circuit of triodes 18 and 19. Thus, the output alternating-current signal is in exact synchronism with the input direct-current analog signal. The circuit of FIG. 1 also lends itself to uses demanding a highly accurate switching circuit in that an alternating-current amplifier is utilized which may be made of substantially minimum drift and accurately stabilized by the negative feedback circuit employed. A negative feedback circuit is obtained in FIG. 1 by the inversion of the square wave signal previously described in relation to FIG. 2.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Switching means comprising electronic chopper means connected to receive and chop an electrical signal for producing a substantially square wave alternating-current signal, amplifier means having its input connected to receive said A.-C. signal and its output connected to present an amplified A.-C. signal, switch means for establishing a reference voltage level on said input and said output, and gating means synchronized with said chopper means to be 180° out of phase with said chopper means, said gating means connected to receive the output of said amplifier for providing a gated, square wave alternating-current output signal.

2. The combination in claim 1 wherein is included negative feedback means connecting the output of said gating means to the input of said chopper means.

3. A switching circuit comprising in combination a first diode having its anode connected to be biased to a current flow value substantially equal to its conduction crossover point, a second diode having its cathode connected to the cathode of said first diode and having its anode connected to be biased to a current flow value substantially equal to its conduction crossover point, electronic valve means for alternatively shunting the bias currents supplied to said diodes thereby rendering said diodes alternately non-conducting.

4. The combination in claim 3 wherein said electronic valve means comprise a pair of triodes each having a respective anode-cathode circuit connected between the anodes of said diodes and a predetermined reference potential for rendering said diodes non-conducting when said triodes are conducting, and timing means for causing said triodes to alternatively conduct.

5. A switching circuit comprising in combination a first diode having its anode-cathode circuit connected in series between the plus and ground terminal of a source of direct current, said diode biased to a current flow value substantially equal to its conduction crossover point, a second diode having its anode-cathode circuit connected in series between the plus and ground terminal of said source of direct current, said diode biased to a current flow value substantially equal to its conduction crossover point, the cathodes of said diodes being conductively connected, a first electronic valve for shunting the bias current supplied to said first diode thereby rendering said first diode non-conducting, a second electronic valve for shunting the bias current supplied to said second diode thereby rendering said second diode non-conducting, and means for causing said first and second electronic valves to alternatively conduct.

6. Switching means responsive to low level analog signals for producing high level substantially square wave alternating-current signals comprising, first unidirectional conduction means for receiving said analog signals, first electronic switch means connected to render said first unidirectional conduction means non-conductive and conductive, amplifier means having its input connected to receive the output of said first unidirectional conduction means, second electronic switch means connected to establish a predetermined reference voltage level on the input of said amplifier means when closed, second unidirectional conduction means for receiving the output of said amplifier means, third electronic switch means connected to render said second unidirectional conduction means non-conductive and conductive, fourth electronic switch means connected to establish a predetermined reference voltage level on the output of said second unidirectional conducting means when closed whereby the output of said second unidirectional conduction means is connected to present high level substantially square wave alternating-current signals.

7. The combination recited in claim 6 wherein is included means for synchronizing said electronic switch means whereby said first and fourth switch means and said second and third switch means are synchronized to alternately open and close.

8. Switching means responsive to low level analog signals for producing high level substantially square wave alternating-current signals comprising, a first diode having its anode connected to receive said analog signals, a first electronic switch connected to bias said diode to cutoff when closed and render said diode conductive when open, timing means for controlling said first electronic switch whereby the output of said first diode is a chopped alternating-current signal, an A.-C. amplifier responsive to said first diode for producing high level square wave alternating-current signals, a second diode having its plate connected to receive said alternating-current signals from said amplifier, a second electronic switch connected to bias said diode to cutoff when closed and render said diode conductive when open, said second electronic switch connected to be controlled by said timing means whereby said second switch is open when said first switch is closed.

9. The combination recited in claim 8 wherein is included negative feedback means connected between the output of said second diode and the input of said first diode to control the gain of said switching means.

10. A high speed low level switching circuit comprising a first diode having its anode connected to receive low level direct-current analog signals, first electronic switch means connected to the anode of said first diode to bias said diode to cutoff when closed and render said diode conductive when open, multivibrator means for controlling said first switch whereby the cathode of said first diode presents substantially square wave alternating-current signals, means for amplifying said alternating-current signals, means for inverting the output of said amplifier means to produce alternating-current signals 180° out of phase with the alternating-current signals at the cathode of said diode, and resistor means to feed-back a portion of the output of said inversion means to the plate of said diode to control the gain of said switching circuit.

11. The combination recited in claim 10 wherein said inversion means comprise a second diode having its plate connected to receive the output of said amplifying means and its cathode connected to present alternating-current output signals, a second electronic switch means connected to the plate of said second diode to bias said diode to cutoff when closed and render said diode conductive when open, said second electronic switch responsive to said multivibrator means to alternatively open and close with respect to said first electronic switch whereby the cathode of said second diode presents alternating-current square wave signals 180° out of phase with the alternating-current signals presented by the cathode of said first diode.

12. A high speed low level switching circuit comprising a first diode having its anode connected to receive low level direct-current analog signals, first electronic switch means connected to the plate of said first diode to bias said diode to cutoff when closed and render said diode conductive when open, timing means for alternately opening and closing said first electronic switch means at a predetermined frequency whereby the cathode of said first diode presents substantially square wave alternating-current signals, means for amplifying said alternating-current signals, means for inverting the output of said amplifying means comprising a second diode having its plate connected to receive the output of said amplifying means, second electronic switch means connected to the plate of said second diode to bias said diode to cutoff when closed and render said diode conductive when open, said second electronic switch responsive to said timing means to alternately open and close with respect to said first electronic switch whereby the cathode of said second diode presents alternating-current square wave signals 180° out of phase with the A.-C. signals presented by the cathode of said first diode, third electronic switch means synchronized with said second electronic switch means for establishing a predetermined reference level on the cathode of said first diode, and fourth electronic switch means synchronized with said first electronic switch means for establishing a predetermined reference level on the cathode of said second diode.

13. The combination recited in claim 12 wherein is included resistor feedback means connected between the cathode of said second diode and the plate of said first diode to feed back a portion of the signal on the cathode of said second diode.

References Cited in the file of this patent

UNITED STATES PATENTS

| | | |
|---|---|---|
| 2,497,129 | Liston | Feb. 14, 1950 |
| 2,782,303 | Goldberg | Feb. 19, 1957 |
| 2,798,667 | Spielberg et al. | July 9, 1957 |
| 2,835,450 | Brown | May 20, 1958 |
| 2,874,235 | Hartwig et al. | Feb. 7, 1959 |
| 2,888,523 | Ross | May 26, 1959 |
| 2,901,563 | McAdam et al. | Aug. 25, 1959 |